US012668367B2

(12) United States Patent
Harden et al.

(10) Patent No.: US 12,668,367 B2
(45) Date of Patent: Jun. 30, 2026

(54) ICE PROTECTION APPARATUS AND SYSTEM

(71) Applicant: CAV Ice Protection Limited, Durham (GB)

(72) Inventors: Robert Brock Harden, Colorado Springs, CO (US); Niall Jude Boxwell, Durham (GB)

(73) Assignee: CAV Ice Protection Limited, Durham (GB)

( * ) Notice: Subject to any disclaimer, the term of this patent is extended or adjusted under 35 U.S.C. 154(b) by 0 days.

(21) Appl. No.: 19/137,104

(22) PCT Filed: Dec. 13, 2023

(86) PCT No.: PCT/GB2023/053212
§ 371 (c)(1),
(2) Date: Jun. 9, 2025

(87) PCT Pub. No.: WO2024/127006
PCT Pub. Date: Jun. 20, 2024

(65) Prior Publication Data
US 2026/0077866 A1 Mar. 19, 2026

(30) Foreign Application Priority Data
Dec. 13, 2022 (GB) ..................................... 2218766

(51) Int. Cl.
B64D 15/08 (2006.01)
B64C 11/20 (2006.01)
B64U 30/29 (2023.01)

(52) U.S. Cl.
CPC .............. B64D 15/08 (2013.01); B64C 11/20 (2013.01); B64U 30/29 (2023.01)

(58) Field of Classification Search
CPC ........ B64D 15/06; B64D 15/08; B64D 15/10; B64D 15/16; B64C 11/20
See application file for complete search history.

(56) References Cited

U.S. PATENT DOCUMENTS

| | | | | |
|---|---|---|---|---|
| 2,269,635 A | * | 1/1942 | Mosehauer | ............ B64D 15/16 244/134 C |
| 2,334,175 A | * | 11/1943 | Clay | ...................... B64D 15/16 244/134 C |
| 2,335,018 A | | 11/1943 | Morris et al. | |

(Continued)

FOREIGN PATENT DOCUMENTS

| | | |
|---|---|---|
| CA | 3095372 | 10/2019 |
| CN | 112193420 | 1/2021 |

(Continued)

*Primary Examiner* — Richard Green
(74) *Attorney, Agent, or Firm* — Wells St. John P.S.

(57) ABSTRACT

A freezing point depressant (FPD) fluid distribution apparatus and ice protection system for a propeller blade, the apparatus comprising an upper section and a lower section, wherein the upper section is configured to distribute FPD fluid to the low pressure side of a propeller blade, and the lower section is configured to distribute FPD fluid to the high pressure side of a propeller blade, and wherein the upper and lower sections each comprise one or more FPD fluid chambers, the or each FPD fluid chamber comprising an associated fluid-permeable cover.

22 Claims, 6 Drawing Sheets

(56)        References Cited

U.S. PATENT DOCUMENTS

| | | | |
|---|---|---|---|
| 2,339,772 | A | 1/1944 | De Stefano |
| 2,354,764 | A * | 8/1944 | Martin .................. B64D 15/16 |
| | | | 244/134 C |
| 2,576,487 | A | 11/1951 | Stanley |
| 2,619,305 | A | 11/1952 | Enos |
| 2,876,970 | A | 3/1959 | Halbert |
| 2021/0129998 | A1 | 5/2021 | Goodfellow-Jones et al. |

FOREIGN PATENT DOCUMENTS

| | | |
|---|---|---|
| GB | 557191 | 11/1943 |
| GB | 2218766.0 | 2/2023 |
| WO | PCT/GB2023/053212 | 3/2024 |

* cited by examiner

FIGURE 3c    SECTION A-A

SECTION B-B

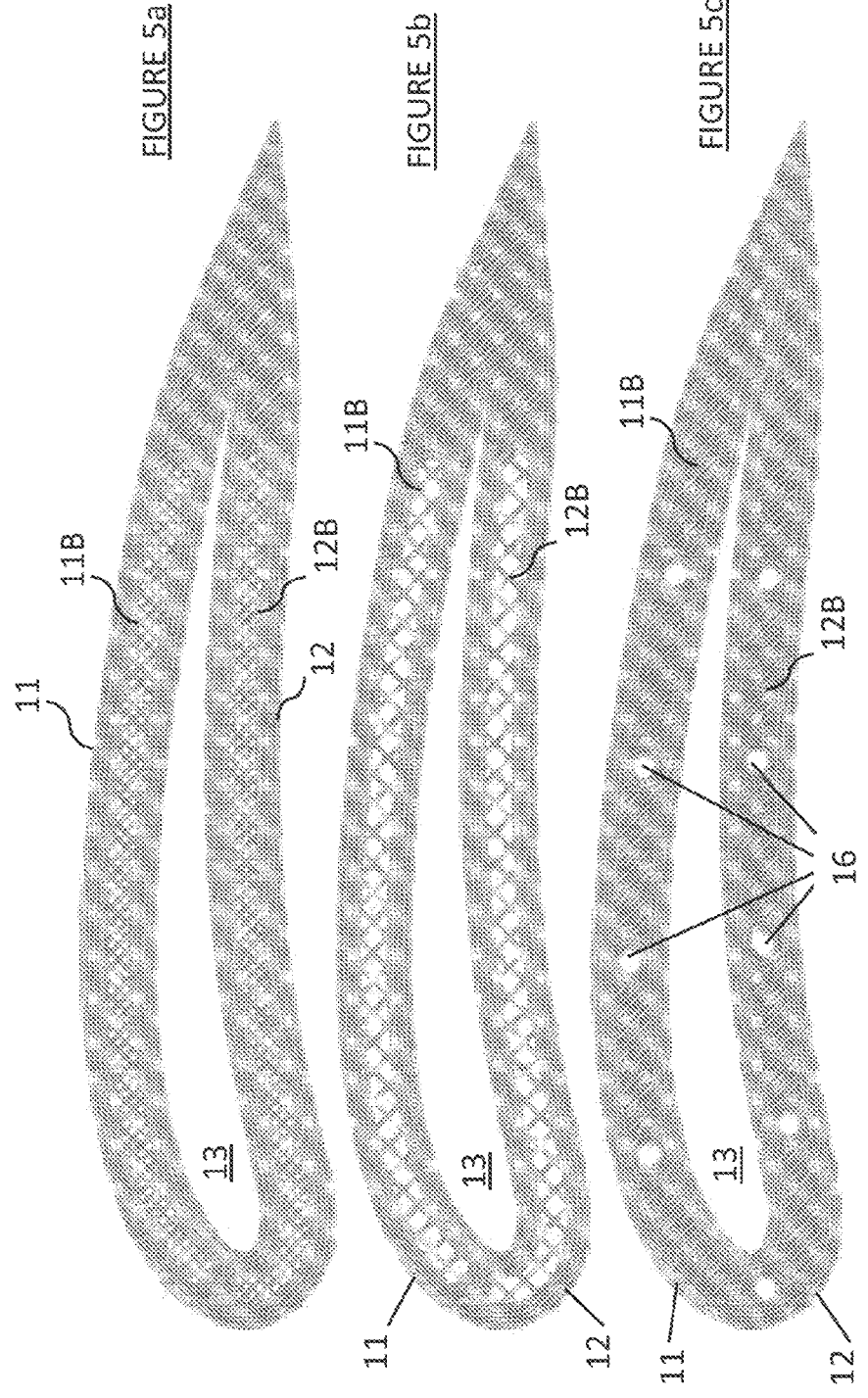

1

ICE PROTECTION APPARATUS AND SYSTEM

The present invention relates to an ice protection apparatus and system for propeller aircraft, in particular but not exclusively for unmanned aerial vehicles.

SUMMARY OF THE INVENTION

In accordance with an aspect of the invention there is provided a freezing point depressant (FPD) fluid distribution apparatus for a propeller blade, the apparatus comprising an upper section and a lower section, wherein the upper section is configured to distribute FPD fluid to the low pressure side of a propeller blade, and the lower section is configured to distribute FPD fluid to the high pressure side of a propeller blade, wherein the upper and lower sections each comprise one or more FPD fluid chambers, the or each FPD fluid chamber comprising an associated fluid-permeable cover.

Conveniently, each FPD fluid chamber is configured to collect FPD fluid introduced to the fluid distribution apparatus.

It will be understood that the low pressure side of the blade is the side of the propeller blade that generates lift.

It will be understood that FPD fluids include de-icing fluids for removal of ice contamination and anti-icing fluids for prevention of ice formation.

Optionally, the FPD fluid distribution apparatus is configured for chord-wise orientation on a propeller blade.

Optionally, the upper section and the lower section of the (FPD) fluid distribution apparatus are configured to project above the respective surfaces of the lower pressure and high pressure sides of the propeller blade.

Optionally, the FPD fluid distribution apparatus is substantially aerofoil shaped.

Optionally, the FPD fluid distribution apparatus comprises a leading edge and a trailing edge.

Optionally, the upper and lower sections of the FPD fluid distribution apparatus define an external or outer aerofoil surface having a leading edge and a trailing edge.

Optionally, the outer aerofoil surface is an airflow-engaging surface.

Optionally, the FPD fluid distribution apparatus is a lift-generating body.

In examples, the upper and lower sections of the FPD fluid distribution apparatus are integrally formed with, or form part of, a propeller blade structure.

Optionally, the upper section and the lower section of the FPD fluid distribution apparatus are connected at their respective ends.

In examples, the FPD fluid distribution apparatus is a propeller blade-mountable cuff.

Optionally, wherein the FPD fluid distribution apparatus is a propeller blade-mountable cuff, said cuff is configured for chord-wise mounting to a propeller blade.

Optionally, wherein the FPD fluid distribution apparatus is a propeller blade-mountable cuff, the upper section and the lower section of the FPD fluid distribution apparatus are connected at their respective ends to form a loop having a central opening, the central opening configured to permit insertion of a propeller blade.

Optionally, the central opening has a shape and/or profile corresponding to the shape and/or profile of a propeller blade at the intended mounting location of the cuff on said propeller blade.

Optionally, the central opening comprises a substantially aerofoil-shaped propeller-engaging surface.

Optionally, the upper and lower sections of the FPD fluid distribution apparatus are integrally formed.

Optionally, the upper and lower sections of the FPD fluid distribution apparatus each comprise a single elongate FPD fluid chamber.

Optionally, each fluid chamber extends substantially from a location proximate a leading edge of the FPD fluid distribution apparatus to a location proximate a trailing edge of the FPD fluid distribution apparatus.

Optionally, at the leading edge of the FPD fluid distribution apparatus, the fluid chambers are separated by a partition or wall.

Optionally, each fluid chamber is formed in the side of the FPD fluid distribution apparatus that faces in the direction of a propeller blade tip in use, i.e. the 'tip side' of the apparatus.

Optionally, each fluid chamber comprises a trough extending into the FPD fluid distribution apparatus from the tip side of the FPD fluid distribution apparatus.

Optionally, each fluid chamber comprises a base bounded by sidewalls upstanding from said base.

Optionally, the base is downwardly V-shaped.

Optionally, the base is concave.

Optionally, each fluid chamber comprises an associated inlet opening.

Optionally, the inlet opening extends from the base of the fluid chamber to the opposing side of the FPD fluid distribution apparatus, i.e. the side of the FPD fluid distribution apparatus that faces in the direction of a propeller blade root in use, i.e. the 'root side' of the FPD fluid distribution apparatus.

Optionally, the inlet opening is provided in the base of the fluid chamber proximate the leading edge of the FPD fluid distribution apparatus.

Optionally, each inlet opening is configured for connection with a fluid feed tube that conveys FPD fluid from a slinger ring to the FPD fluid distribution apparatus.

Optionally, the feed tube is externally routed along the propeller blade.

Optionally, the feed tube is internally routed within the propeller blade.

Optionally, the fluid-permeable cover is configured to secrete FPD fluid contained within the fluid chamber to the exterior of the tip side of the FPD fluid distribution apparatus.

Advantageously, upon secretion through the fluid-permeable cover, FPD fluid is susceptible for slinging from the tip side of the FPD fluid distribution apparatus whereupon it is dispersed along the upper and lower surfaces of the rotating propeller blade in use.

Optionally, the fluid-permeable cover is integrally formed with the FPD fluid distribution apparatus.

Optionally, the fluid-permeable cover comprises a porous structure.

Optionally, the porous structure comprises a lattice structure.

Optionally, the fluid permeable cover comprises one or more apertures, the or each aperture in fluid communication with a fluid chamber.

Optionally, the FPD fluid distribution apparatus is manufactured by 3D printing.

Optionally, the FPD fluid distribution apparatus is manufactured from ABS or other suitable material.

Optionally, the porous structure of the fluid-permeable cover is formed by 3D printing.

Optionally, the porous structure of the fluid-permeable cover is integrally formed with the FPD fluid distribution apparatus during 3D printing.

Optionally, the porosity and/or pattern of the porous structures is/are controlled during manufacture by means of the 'infill' characteristic function of the 3D printing process.

Optionally, the porosity and/or pattern of the porous structures is/are designed at 3D model level. For example, the fluid permeable cover may comprise one or more apertures, the or each aperture in fluid communication with a fluid chamber and individually modelled at modelling level.

According to a further aspect of the invention there is provided an ice protection system comprising:

an FPD fluid distribution apparatus in accordance with the first aspect of the invention; and an FPD fluid supply system configured to transfer a freezing point depressant fluid from a fluid reservoir to said FPD fluid distribution apparatus.

Optionally, the FPD fluid supply system comprises at least one source of gas propellant, at least one pressure regulator, at least one fluid reservoir, at least one solenoid valve, at least one fluid conduit.

Optionally, the FPD fluid supply system comprises a means to means to effect fluid transfer fluid across a rotating assembly.

Optionally the means to effect fluid transfer fluid across a rotating assembly comprises a nozzle and a slinger ring.

Optionally, the FPD fluid supply system comprises at least one controller.

Optionally, the FPD fluid supply system includes a manifold associated with the gas propellant source and the pressure regulator.

Optionally, the manifold and the pressure regulator are integrated into the head of the fluid reservoir, Optionally, the FPD fluid supply system comprises one or more sensors in communication with the controller. Optionally, the one or more sensors comprise an ice detection means.

Optionally, the gas propellant is $CO_2$.

Optionally, the pressure regulator is a static pressure regulator. Optionally, the fluid conduit or conduits comprise nylon tubing.

Optionally, the controller is a Pulse Width Modulation (PWM) controller.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification.

Various aspects of the invention will now be described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, the words "typically" or "optionally" are to be understood as being intended to indicate optional or non-essential features of the invention which are present in certain examples but which can be omitted in others without departing from the scope of the invention.

Directional references such as "upper or "lower" etc. are to be understood in the context of a horizontal plane.

With reference to the Figures, examples of the invention will now be described.

BRIEF DESCRIPTION OF THE DRAWINGS

The present invention will now be described, by way of example only and not in any limitative sense, with reference to the accompanying drawings, in which:

FIG. 3c is a cross section taken along line A-A of FIG. 3a;

FIGS. 5*a*, 5*b* and 5*c* are exemplary schematic side elevation cross sections showing the sides of the apparatus that face in the direction of a propeller blade tip in use;

DETAILED DESCRIPTION

Figure 1:
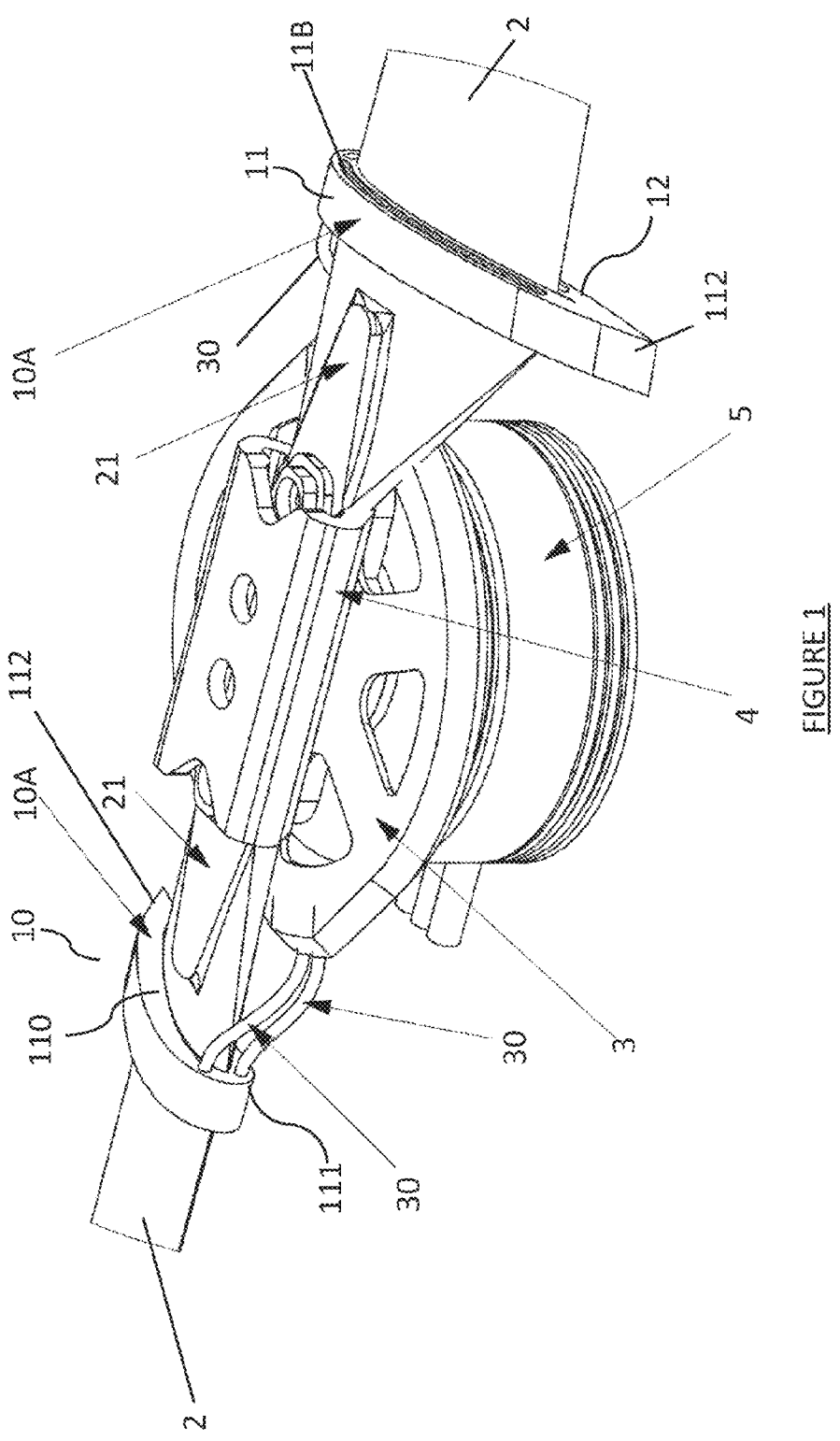
FIG. 1 is an exemplary schematic showing a propeller assembly incorporating a FPD fluid distribution apparatus in accordance with the invention.

Referring initially to FIG. 1 there is shown an exemplary a propeller assembly 1 comprising a plurality of propeller blades 2 mounted upon a slinger ring 3. A rotational restraining clip 4 may be provided at or between the blade roots 21 of the respective propeller blades 2. While two propeller blades are shown, any suitable number of blades may be employed. The propeller 2 and slinger ring 3 assembly is mountable to a rotatable drive means, for example the drive hub 5 or shaft of a motor.

As shown in FIG. 1, each propeller blade 2 is provided with a FPD fluid distribution apparatus 10 configured to distribute freezing point depressant (FPD) fluid onto the propeller blade 2.

Figure 6:
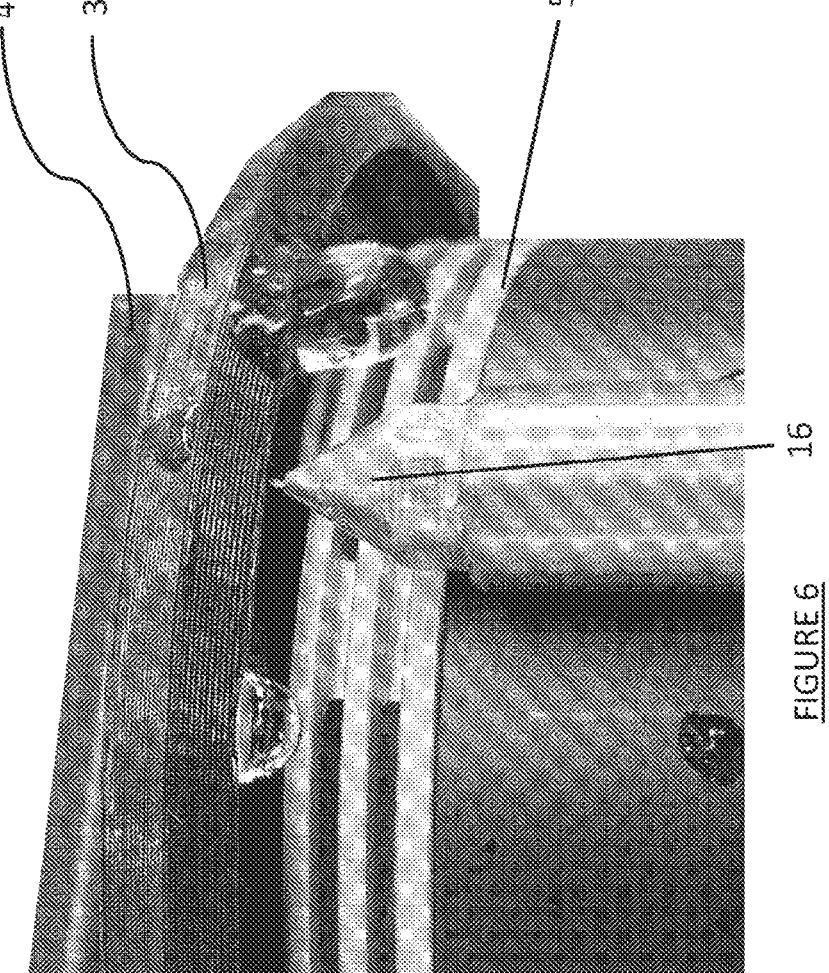
FIG. 6 is an exemplary schematic diagram showing fluid transfer to a slinger ring of a de-icing system in accordance with the invention.

With reference to FIG. 6, the slinger ring 3 comprises a disc member with an open channel (not shown) running on a lower, inside lip of said member. In use, FPD fluid sprayed from a nozzle or nozzles 32 into the slinger ring is centrifugally pushed into the open channel and into associated fluid feed tubes 30. Slinger rings of this type are well known in the art and provide a means to effect fluid transfer across a rotating assembly.

As shown by way of example in FIG. 1, an FPD fluid distribution apparatus 10 is disposed chord-wise on the propeller blade 2.

It will be understood that the low pressure side of the blade is the side of the propeller blade that generates lift.

The FPD fluid distribution apparatus 10 comprises an upper section 11 disposed substantially on the on the low pressure side of the propeller, and a lower section 12 disposed substantially on the high pressure side of the propeller blade. As will be described in further detail below, the upper and lower sections 11, 12 of FPD fluid distribution apparatus 10 each comprise one or more FPD fluid chambers, the or each FPD fluid chamber comprising an associated fluid-permeable cover. Each FPD fluid chamber is configured to collect FPD fluid introduced to the fluid distribution apparatus via a fluid feed tube 30 as described below.

As shown in FIG. 1, the upper section 11 and the lower section 12 of the FPD fluid distribution apparatus project above the respective surfaces of the lower pressure and high pressure sides of the propeller blade 2.

In example shown in FIG. 1, the upper and lower sections 11, 12 of the FPD fluid distribution apparatus 10 are integrally formed with, or form part of, a propeller blade 2 structure. Thus in examples, the FPD fluid distribution apparatus is blade-integrated apparatus 10A.

Alternatively, as described below and shown by way of example in FIG. 2 and FIG. 3*a*, the FPD fluid distribution apparatus may be in the form a propeller blade-mountable cuff 10B.

In either case, the upper and lower sections 11, 12 may be integrally formed whereby the FPD fluid distribution apparatus 10A, 10B is of unitary construction.

As shown in the FIGS. 1, 2, 3*a*, 4*a*, 4*b*, the FPD fluid distribution apparatus 10A, 10B is substantially aerofoil-shaped, having a leading edge 111 and a trailing edge 112, and with the upper 11 and lower 12 sections of the FPD fluid distribution apparatus defining an external or outer aerofoil surface 110. The FPD fluid distribution apparatus 10A, 10B of the present invention is capable of generating lift.

As shown by way of example in FIG. 1, in use the FPD fluid distribution apparatus 10A, 10B is positioned chord-wise on the propeller blade 2, optionally at a location proximate the blade root 21. It will be appreciated FPD fluid distribution devices in accordance with the invention can be located at any suitable location on a propeller blade, and is not limited to use proximate the blade root. In addition, more than one FPD fluid distribution devices may be provided on a propeller blade, for example when a propeller blade is large, a further FPD fluid distribution device may be provided proximate the midpoint of the blade.

Figures 2, 3A, 3B:
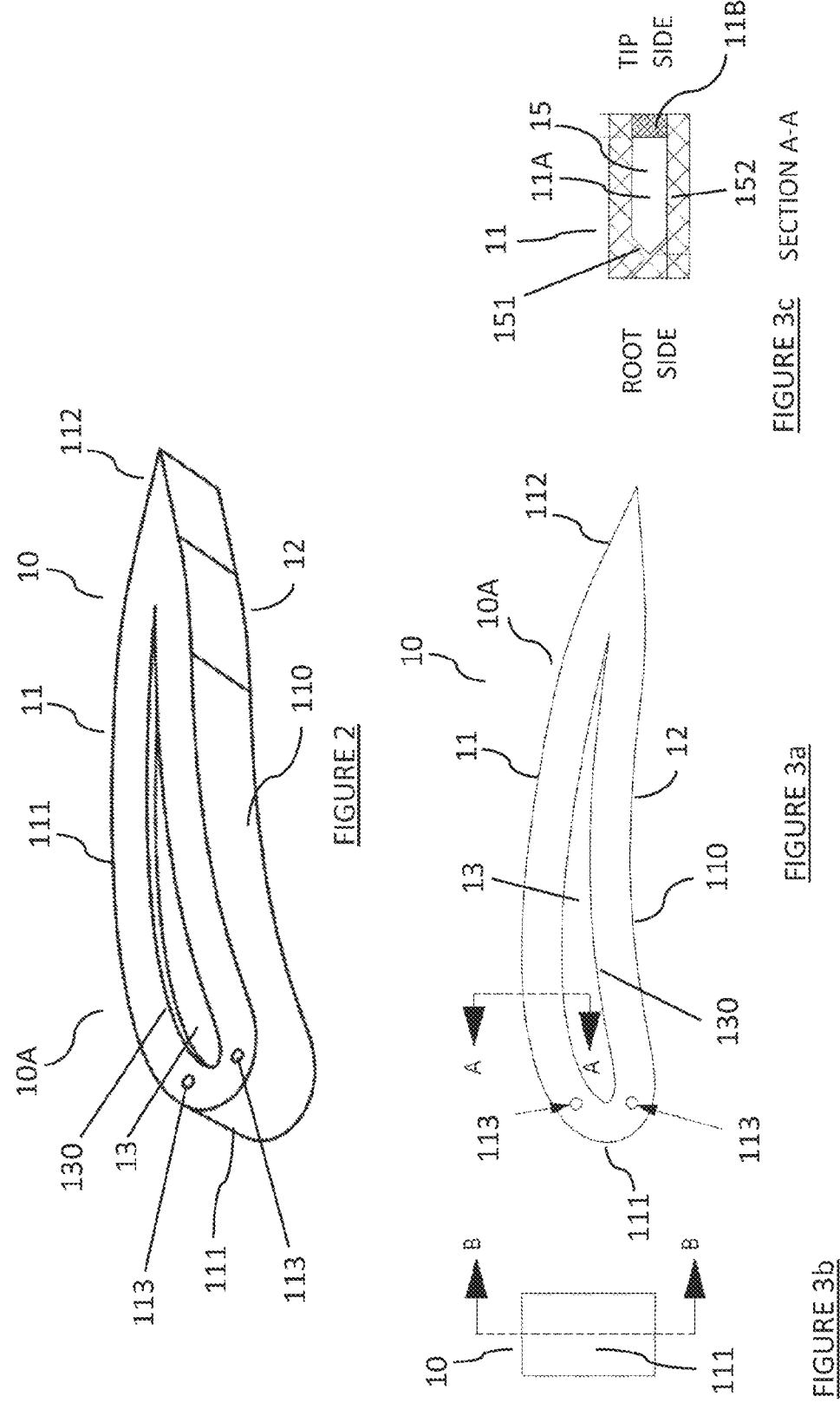
FIG. 2 is a perspective view of an exemplary FPD fluid distribution apparatus in accordance with the invention in the form of a propeller blade-mountable cuff showing the side of the cuff that faces in the direction of a propeller blade root in use.
FIGS. 3a and 3b are side and front elevations of the apparatus of FIG. 2.

With reference to FIGS. 2 and 3*a*, in which the FPD fluid distribution apparatus is shown in the form a propeller blade-mountable cuff 10B, said cuff 10B additionally comprises a central opening 13.

Central opening 13 is substantially aerofoil-shaped, whereby the inner aerofoil-shaped surface 130 of said central opening 13 is a propeller-engaging surface.

Figures 4A, 4B:
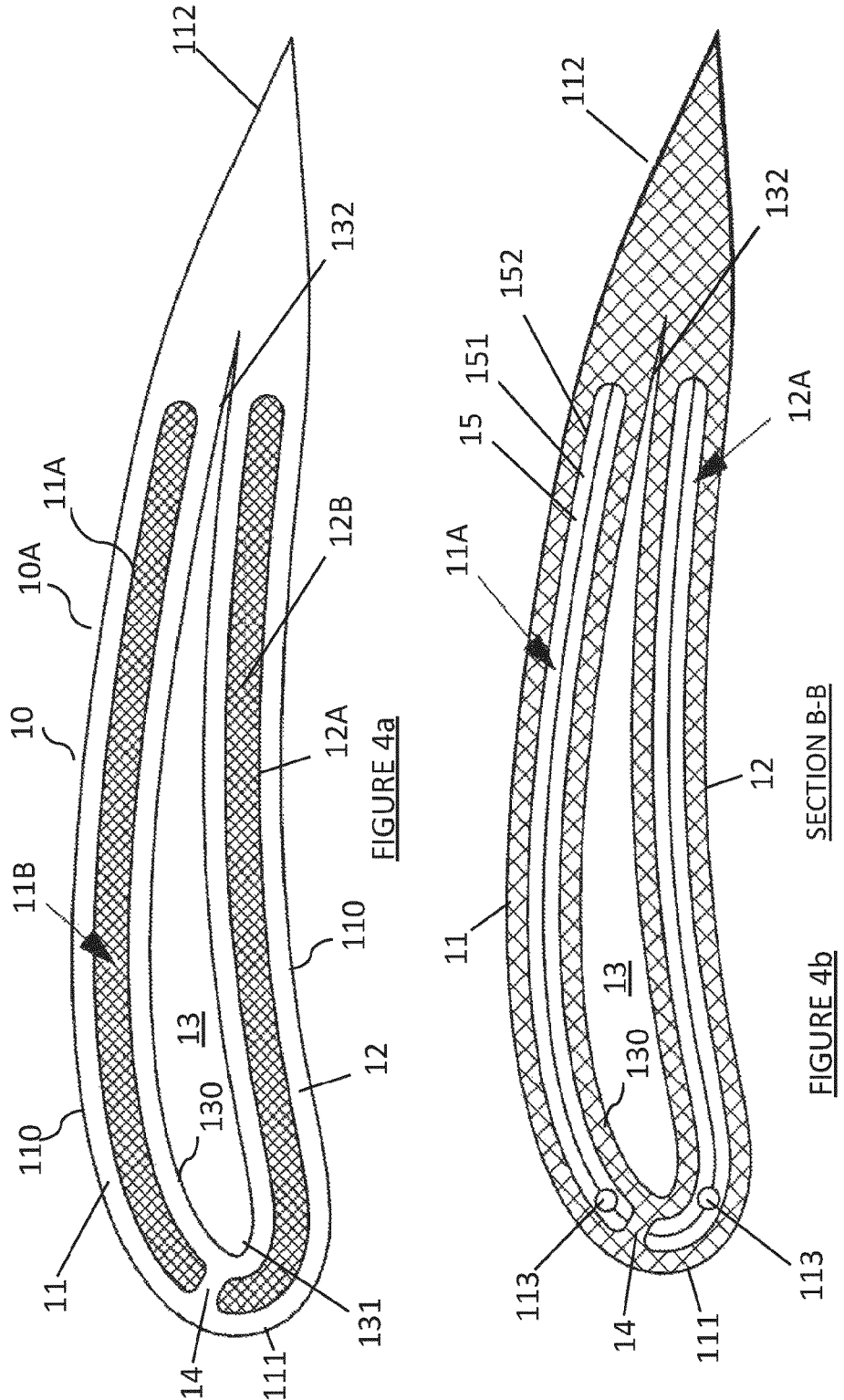
FIG. 4a is a schematic side elevation of a cuff showing the side of the apparatus that faces in the direction of a propeller blade tip in use.
FIG. 4b is a schematic side elevation cross section showing the side of the apparatus that faces in the direction of a propeller blade tip in use.

With reference to FIGS. 4*a* and 4*b*, the inner aerofoil-shaped surface 130 comprises a leading edge 131 and a trailing edge 132. The inner aerofoil-shaped surface 130, and thus the central opening 13, has a profile configured to substantially correspond with the aerofoil profile of a propeller blade 2 at the intended mounting location of a cuff 10B on said propeller blade.

As described above, the FPD fluid distribution apparatus, whether in the form of a blade-integrated apparatus 10A or a propeller blade-mountable cuff 10B, comprises one or more FPD fluid chambers, the or each FPD fluid chamber comprising an associated fluid-permeable cover. Detail of the fluid chambers and fluid-permeable covers will now be described with particular reference to Figures which may specifically depict a propeller blade-mountable cuff 10B, however it will be understood that as the arrangement of the fluid chambers and fluid-permeable covers is common between blade-mountable cuffs 10B and blade-integrated examples 10A, and so the following applies equally to both blade-mountable cuffs and blade-integrated examples 10A of the invention.

With reference to 4*b* (which is a cross section of an FPD fluid distribution apparatus 10 in the form of a cuff 10B along the section B-B shown in FIG. 3*b*), cuff 10 comprises one or more chambers 11A, 12A. Conveniently, chambers 11A, 12A are FPD fluid chambers. Optionally, cuff 10 comprises first and second FPD fluid chambers 11A, 12A in its respective upper 11 and lower sections 12.

Optionally, fluid chambers 11A, 12A are elongate. Optionally, each fluid chamber 11A, 12A extends substantially from a location proximate the leading edge 111 of the FPD fluid distribution apparatus 10 to a location proximate the trailing edge 132 of the inner aerofoil surface 130. At the leading edge of the FPD fluid distribution apparatus 10, the fluid chambers 11A, 12A are separated by a partition or wall 14.

Each fluid chamber 11A, 12A is formed in the side of the FPD fluid distribution apparatus 10 that faces in the direction of a propeller blade tip in use. For brevity, this side of the FPD fluid distribution apparatus 10 may be referred to as the 'tip side' of the apparatus.

As shown by way of example in FIG. 3c, which is a cross section of a cuff 10B upper section 11 along section A-A shown in FIG. 3b, fluid chambers 11A, 11B comprise a trough 15 extending partially through the width of the FPD fluid distribution apparatus 10 from the tip side of the apparatus.

As shown most clearly in FIG. 4b, troughs 15 which substantially define fluid chambers 11A, 12A in the upper 11 and lower sections 12 of the FPD fluid distribution apparatus 10 have a base 151 bounded by an upstanding sidewall 152. Base 151 may have any suitable shape. As shown in FIG. 3c, base 151 may taper, for example in a V-shape. It has been found that a V-shaped base allows FPD fluid distribution devices in accordance with the invention to 3D printed by fused means of filament fabrication (FFF) without the need for support material which would otherwise be impossible to remove. However, it will be understood that other geometries for the base are possible, for example domed, curved or concave. Similarly, use of different 3D printing technologies, such as but not limited to liquid resin or selective laser sintering (SLS), could obviate the need for a V-shaped base.

As shown in FIG. 4b, each fluid chamber 11A, 12A has an associated inlet opening 113. Each inlet opening 113 extends from the base 151 of the fluid chamber (or trough) to the opposing side of the FPD fluid distribution apparatus 10, i.e. the side of the apparatus that faces in the direction of a propeller blade root in use. For brevity this side of a FPD fluid distribution apparatus 10 may be referred to as the 'root side' of the apparatus. Optionally, each inlet opening 113 is provided proximate the leading edge 111 of the FPD fluid distribution apparatus 10. Each inlet opening 113 is configured for connection with a fluid feed tube 30 which conveys FPD fluid from a slinger ring 3 to the apparatus as shown in FIG. 1. Thus inlet openings 113 enable independent transfer of FPD fluid from the root side of an FPD fluid distribution apparatus 10 to the respective fluid chambers 11A, 12A.

As shown in FIGS. 5a, 5b and 5c, each fluid chamber 11A, 12A comprises an associated fluid-permeable cover 11B, 12B. In use, FPD fluid in the respective fluid chambers secretes through the fluid-permeable cover 11B, 12B to the tip side of the FPD fluid distribution apparatus 10, whereupon the fluid is slung from said tip side of the apparatus and is dispersed along the upper (low pressure) and lower (high pressure) surfaces of the rotating propeller blade 2.

Optionally, a fluid-permeable cover 11B, 12B may comprise a porous structure.

Optionally, the porous structure may comprise a lattice structure.

With reference to FIGS. 5a and 5b, the densities of the porous structures of a fluid-permeable cover 11B, 12B can be varied, for example by employing varying sized pores.

With reference to FIG. 5c, instead of a porous structure, a fluid permeable cover 11B, 12B may instead comprise one or more apertures 16 which permit FPD fluid to directly exit the fluid chambers 11A, 11B.

Optionally, the fluid-permeable cover 11B, 12B may be integrally formed with the FPD fluid distribution apparatus 10A, 10B.

In examples, a FPD fluid distribution apparatus 10 may be manufactured by means of 3D printing. Optionally, a FPD fluid distribution apparatus 10 may be manufactured from ABS or other suitable material.

Optionally, the porous structure of the fluid-permeable covers 11B, 12B is integrally formed with the FPD fluid distribution apparatus 10 during 3D printing.

Optionally, the porosity and/or pattern of the porous structures 11B, 12B may be controlled during manufacture by means of the 'infill' characteristic function of the 3D printing process.

Traditionally, for a typical 3D printed object, "infill" is printed in the interior of solid objects to decrease the amount of material required while still providing some structural rigidity to the object.

Optionally, the porosity and/or pattern of the porous structures is/are designed at 3D model level. For example, where a fluid permeable cover may comprise one or more apertures 16, these may be individually modelled at modelling level.

In accordance with an aspect of the present invention, a 3D model or models of the FPD fluid distribution apparatus is/are generated using a suitable modelling program or software is/are imported into a "slicing" software as three individual bodies, i.e. one FPD fluid distribution apparatus body 10 and two fluid-permeable covers 11B, 12B. The porous structures of the fluid-permeable covers 11B, 12B are defined in the software such that they have a prescribed infill but no top or bottom surfaces. This means that when printed, the porous regions comprise porous structures, or lattices, attached to the FPD fluid distribution apparatus body with no solid surfaces to prevent fluid flow.

For example, as shown in FIGS. 5a and 5b infill percentages of 50-95% may be obtained using "lines" (FIG. 5a), "grid" (FIG. 5b), or "holes" infill patterns.

In a further aspect of the present invention, there is provided an associated FPD fluid supply system 50. With reference to 8a and 8b, in examples the FPD fluid supply system 50 comprises at least one source of gas propellant 52, at least one pressure regulator 54, at least one fluid reservoir 56, at least one solenoid valve 58, at least one fluid conduit 60, at least one fluid nozzle 30 configured to stream FPD fluid to a slinger ring 3 (FIG. 6), and at least one controller (NOT SHOWN).

Optionally, the FPD fluid supply system 50 includes a manifold 53 associated with the gas propellant source 52 and the pressure regulator 54. Optionally, the system 50 comprises one or more sensors (NOT SHOWN) in communication with the controller. Optionally, the one or more sensors comprise an ice detection means.

Optionally, the gas propellant is $CO_2$. Optionally, the pressure regulator 54 is a static pressure regulator. The fluid conduit 60 may be made from any suitable material. Optionally, the fluid conduit 60 comprises nylon tubing. Optionally, the controller is a Pulse Width Modulation (PWM) controller.

Figure 7:
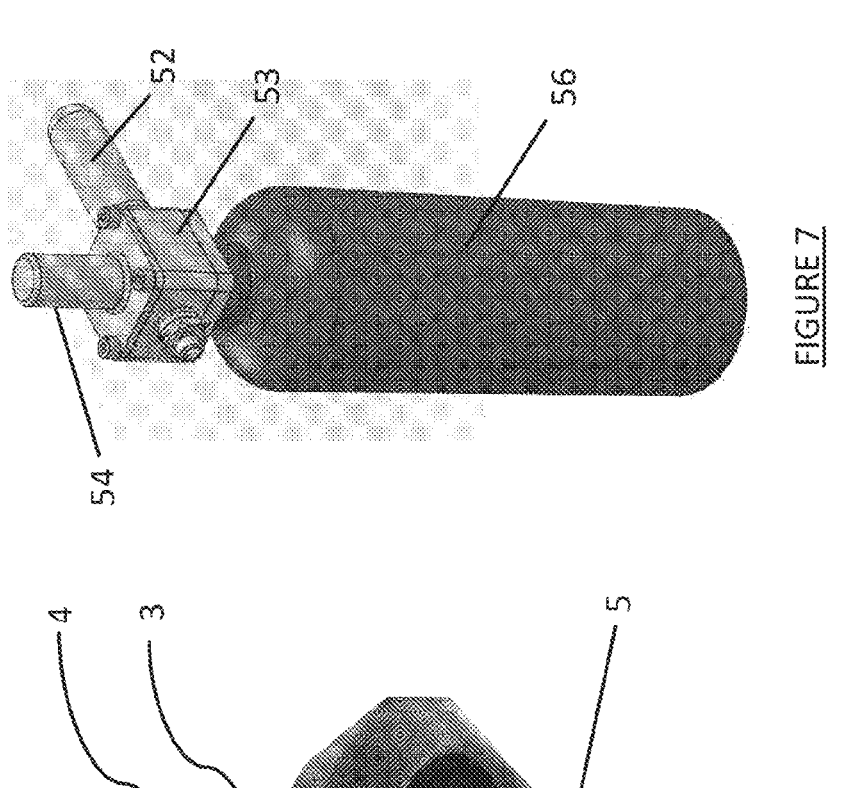
FIG. 7 is schematic of a constant pressure valve, fluid reservoir and propellant assembly accordance with the invention.
Figures 8A, 8B:
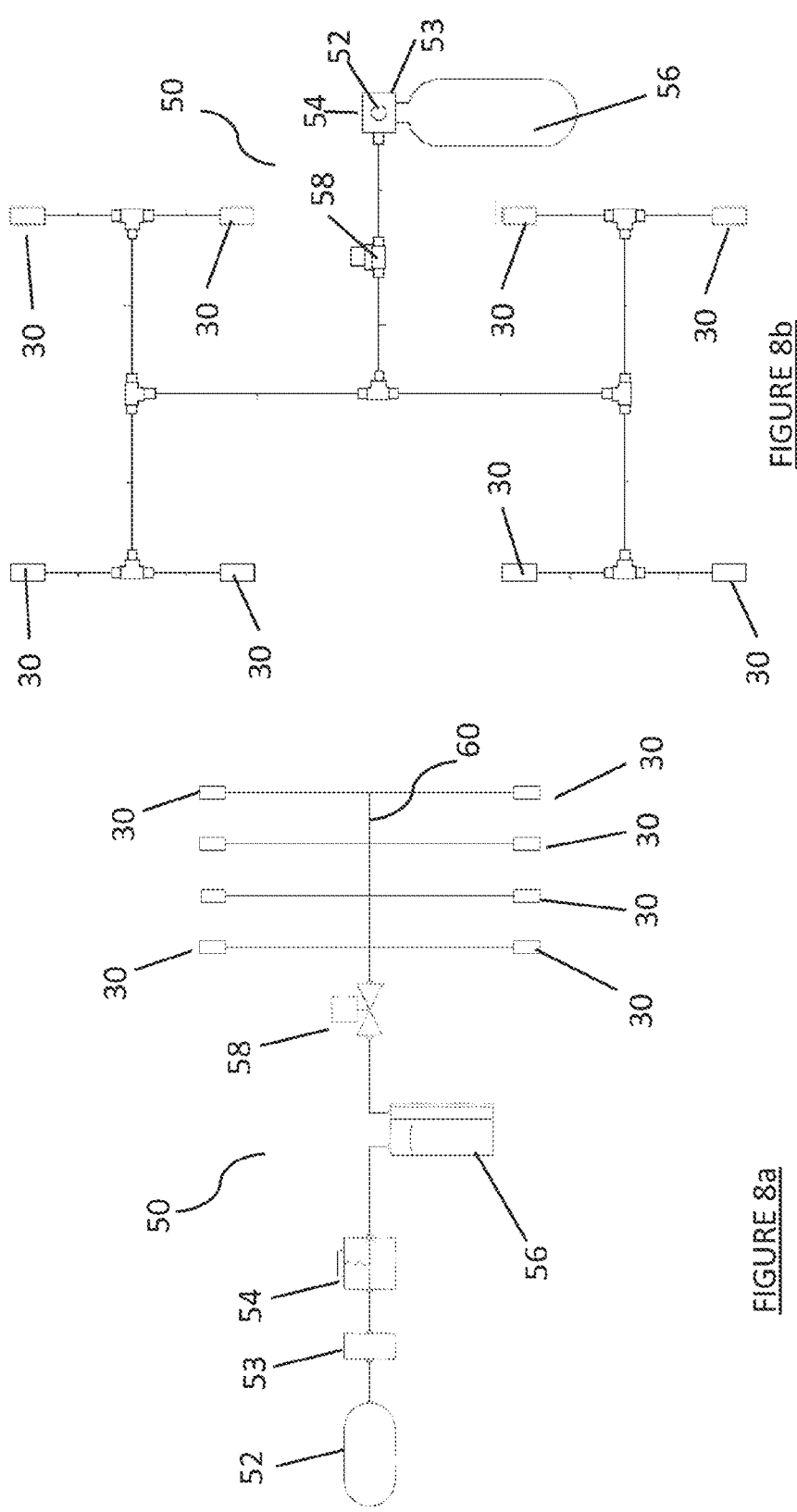
FIGS. 8*a* and 8*b* are schematic diagrams of exemplary freezing point depressant fluid dispersing systems in accordance with the invention.

With reference to FIGS. 8a and 8b, which show exemplary systems configured for use with a UAV having eight propeller assemblies, the system uses compressed gas which is regulated by the regulator 54 to flow FPD fluid to the nozzles 30 via solenoid valve 58 which controls the rate of flow. Each propeller nozzle 30 is associated with a slinger ring 3 (not shown). In examples, the gas reservoir 52 is a disposable threaded $CO_2$ cartridge as shown in FIG. 7. Suitable $CO_2$ cartridges are known from tyre inflators and paintball guns and the likes. Optionally, the manifold 53 and pressure regulator 54 are integrated into the head of the fluid reservoir, which is a pressure vessel, as shown in FIG. 7.

It will be understood that systems in accordance with the invention can be configured for use with propeller aircraft having any number of propeller assemblies or propeller blades.

The state of the solenoid valve 58 is controlled by the controller to allow the FPD fluid low rate to be varied.

Optionally, the PMW controller signal can be manually or automatically controlled. Optionally, automatic control is effected by input signal(s) received from an associated sensor, for example an ice detector (not shown). Advantageously, by adjusting the duty cycle of the PWM signal to the solenoid valve 58 the flow rate can be set between 0 to 100% of the fully open flowrate.

It will be appreciated by persons skilled in the art that the above embodiment(s) has been described by way of example only and not in any limitative sense, and that various alterations and modifications are possible without departing from the scope of the invention.

The invention claimed is:

1. A freezing point depressant (FPD) fluid distribution apparatus for a propeller blade, the apparatus comprising an upper section and a lower section, wherein the upper section is configured to distribute FPD fluid to the low pressure side of a propeller blade, and the lower section is configured to distribute FPD fluid to the high pressure side of a propeller blade, wherein the upper and lower sections each comprise one or more FPD fluid chambers, the or each FPD fluid chamber comprising an associated fluid-permeable cover; and characterised in that each fluid chamber is formed in the side of the apparatus that faces in the direction of a propeller blade tip in use.

2. An FPD fluid distribution apparatus as claimed in claim 1, wherein the upper section and the lower section of the apparatus are configured to project above the respective surfaces of the lower pressure and high pressure sides of a propeller blade.

3. An FPD fluid distribution apparatus as claimed in claim 1, wherein the apparatus is substantially aerofoil shaped.

4. An FPD fluid distribution apparatus as claimed in claim 1, wherein the apparatus comprises a leading edge and a trailing edge, optionally wherein the leading edge and the trailing edge are part of an external or outer aerofoil surface defined by the upper and lower sections of the FPD fluid distribution apparatus.

5. An FPD fluid distribution apparatus as claimed in claim 1, wherein the outer or external aerofoil surface is an airflow-engaging surface, optionally, wherein the FPD fluid distribution apparatus is a lift-generating body.

6. An FPD fluid distribution apparatus as claimed in claim 1, wherein the upper and lower sections of the apparatus are integrally formed with, or form part of, a propeller blade structure.

7. An FPD fluid distribution apparatus as claimed in claim 1, wherein the apparatus is a propeller blade-mountable cuff, optionally wherein the cuff is configured for chord-wise mounting to a propeller blade.

8. An FPD fluid distribution apparatus as claimed in claim 7, wherein the upper section and the lower section apparatus are connected at their respective ends to form a loop having a central opening, the central opening configured to permit insertion of a propeller blade.

9. An FPD fluid distribution apparatus as claimed in claim 1, wherein the upper and lower sections of the apparatus each comprise a single elongate FPD fluid chamber.

10. An FPD fluid distribution apparatus as claimed in claim 9, wherein each fluid chamber extends substantially from a location proximate a leading edge of the apparatus to a location proximate a trailing edge of the apparatus.

11. An FPD fluid distribution apparatus as claimed in claim 9, wherein each fluid chamber comprises a trough extending into the FPD fluid distribution apparatus from the tip side of the FPD fluid distribution apparatus, the trough comprising a base bounded by sidewalls upstanding from said base.

12. An FPD fluid distribution apparatus as claimed in claim 9, wherein each fluid chamber comprises an associated inlet opening, optionally wherein the inlet opening extends from the base of the fluid chamber to the side of the apparatus that faces in the direction of a propeller blade root in use.

13. An FPD fluid distribution apparatus as claimed in claim 12, wherein each inlet opening is provided in the base of a fluid chamber proximate the leading edge of apparatus, optionally wherein each inlet opening is configured for connection with a fluid feed tube that conveys FPD fluid from a slinger ring to the apparatus.

14. An FPD fluid distribution apparatus as claimed in claim 1, wherein the fluid-permeable cover is configured to secrete FPD fluid from within the fluid chamber to the exterior of the FPD fluid distribution apparatus.

15. An FPD fluid distribution apparatus as claimed in claim 1, wherein the fluid-permeable cover is integrally formed with the FPD fluid distribution apparatus.

16. An FPD fluid distribution apparatus as claimed in claim 1, wherein the fluid-permeable cover comprises a porous structure, optionally wherein the porous structure is a lattice structure.

17. An FPD fluid distribution apparatus as claimed in claim 1, or optionally where the porous structure comprises one or more apertures, wherein the or each aperture is in fluid communication with a fluid chamber.

18. An FPD fluid distribution apparatus as claimed in claim 16, wherein the porous structure of the fluid-permeable cover is formed by 3D printing.

19. An FPD fluid distribution apparatus as claimed in claim 1, wherein the apparatus is manufactured by 3D printing.

20. An ice protection system comprising:

an FPD fluid distribution apparatus as claimed in claim 1; and an FPD fluid supply system configured to transfer a freezing point depressant (FPD) fluid from a fluid reservoir to said FPD fluid distribution apparatus.

21. An ice protection system as claimed in claim 20, wherein the FPD fluid supply system comprises at least one source of gas propellant, at least one pressure regulator, at least one fluid reservoir, at least one solenoid valve, at least one fluid conduit.

22. An ice protection system as claimed in claim 20, further comprising an apparatus to effect fluid transfer fluid across a rotating assembly, optionally wherein the apparatus to effect fluid transfer fluid across a rotating assembly comprises a nozzle and a slinger ring.

* * * * *